US007010767B2

(12) United States Patent
Elassaad et al.

(10) Patent No.: US 7,010,767 B2
(45) Date of Patent: Mar. 7, 2006

(54) INSERTION OF REPEATERS WITHOUT TIMING CONSTRAINTS

(75) Inventors: Shauki Elassaad, Los Altos, CA (US); Alexander Saldanha, El Cerrito, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 807 days.

(21) Appl. No.: 09/919,740

(22) Filed: Aug. 1, 2001

(65) Prior Publication Data

US 2004/0257207 A1 Dec. 23, 2004

Related U.S. Application Data

(60) Provisional application No. 60/245,334, filed on Nov. 1, 2000.

(51) Int. Cl.
  *G06F 17/50* (2006.01)

(52) U.S. Cl. .................... 716/6; 716/8; 716/10; 716/13

(58) Field of Classification Search ................ 716/2, 716/6–15, 18
  See application file for complete search history.

(56) References Cited

U.S. PATENT DOCUMENTS

| 5,995,735 | A  | * | 11/1999 | Le ................. 716/13 |
| 6,009,248 | A  |   | 12/1999 | Sato et al. |
| 6,389,581 | B1 |   | 5/2002  | Muddu et al. |
| 6,453,446 | B1 | * | 9/2002  | van Ginneken .......... 716/3 |
| 2001/0010090 | A1 | * | 7/2001 | Boyle et al. ............. 716/2 |
| 2002/0184607 | A1 | * | 12/2002 | Alpert et al. .......... 716/15 |

OTHER PUBLICATIONS

Otten, R. et al. (1998) "Planning for Performance" *Proceedings of the 35th Design Automation Conference*; San Francisco.
van Ginneken, L.P.P.P. (1990) "Buffer Placement in Distributed RC-tree Networks for Minimal Elmore Delay," *Proceedings of the International Symposium on Circuits and Systems* pp. 865-868.
Murgai, R. (1999) "Delay-Constrained Area Recovery Via Layout-Driven Buffer Optimization," *Proceedings of the International Workshop on Logic Synthesis*, Lake Tahoe.
Executive Summary from www.gigascale.org/about/overview/executive-summary.htm.
"The National Technology Roadmap for Semiconductors," (1997) Semiconductor Industry Association.
Copy of International Search Report dated Feb. 4, 2003 for PCT/US02/23681.

* cited by examiner

*Primary Examiner*—Paul Dinh
(74) *Attorney, Agent, or Firm*—John W. Carpenter; ReedSmith, LLP

(57) ABSTRACT

A method/process for repeater insertion in the absence of timing constraints. Delays are optimized for multi-receiver and multi-layer nets and can be introduced in the early steps of design planning. It serves as a tool for interconnect prediction as well as planning. In the presented formulation, no restrictions are made on where the repeaters are added or what the topology of the net is. The tabulated results demonstrate improvement (speed ups) using the method/process of the present invention. The present invention runs in linear time and achieves better results that the existing dynamic programming formulation and other published heuristics. Polarity in a circuit design is corrected by traversing the circuit and carrying backwards a cost of fixing the polarity. On a subsequent traversal, buffers inserted fix the polarity.

23 Claims, 5 Drawing Sheets

INSERTION OF REPEATERS WITHOUT TIMING CONSTRAINTS

CROSS REFERENCE TO RELATED APPLICATIONS AND CLAIM OF PRIORITY

This invention claims priority to the following co-pending U.S. provisional patent application, which is incorporated herein by reference, in its entirety:

Saldanha et al, Provisional Application Ser. No. 60/245,334, entitled "System Chip Synthesis," attorney docket no. 21891.02100, filed, Nov. 1, 2000.

BACKGROUND OF THE INVENTION

1. Field of Invention

The present invention relates generally to the field of integrated circuits, and more particularly to a method of inserting repeaters into integrated circuit wires without timing constraints.

2. Discussion of Background

The Semiconductor Industry Association's (SIA) 1997 National Technology Roadmap for Semiconductors (NTRS) (www.scmichips.org) looked at the challenges the semiconductor industry would have to overcome in order to sustain the rapid technology development it has enjoyed in the past several years. The NTRS report concluded that the industry is rapidly approaching a formidable "100 nm barrier" that threatens the continuation of the historical success the industry has enjoyed. The most alarming finding of this working group was that the industry has become very "idea limited," and almost all areas of design technology would hit a brick wall by the year 2006, when the industry anticipates the first shipment of 100 nm technology.

Before any revolutionary solutions are available to combat this crisis, innovations are still required to solve the immediate problems of keeping up with the requirements till the year 2006. The NTRS predicts that overall design productivity has to improve by about 10% every year, overall design cycle times have to improve by 25% every year, 60% of the design content will need to be reusable, and that synthesis and physical design need to be coupled (including asynchronous logic).

The Gigascale Silicon Research Center (GSRC, www.gigascale.org), a center funded by SIA/SEMATECH to conduct potentially long-lead research into this problem, categorized the problems identified in the 1997 NTRS as:

Problems of the Small: issues related to small device geometry and the evolving role of interconnect and communication among devices and subsystems Problems of the Large: related to the large systems that go on a chip, including design, verification and testing of large systems Problems of the Diverse: Issues related to the diversity of subsystems on a chip, including digital, analog. RF and memory devices.

Many tools have been created to address the various issues that need to be solved in order to overcome the nano-metric challenge. These include the Epsilon project (Sophia R&D group), the PKS product (Ambit group), QPOpt/PBOpt family of transformations (DSM group), the Signal Integrity initiatives in SE/Ultra and various other design and verification initiatives.

However, it has become very clear that even if the various components of a design automation toolset could handle specific issues in their respective domain, the overall problems of size, diversity and productivity may not he solved unless a coherent and comprehensive approach to tools working together in a convergent flow is taken. Also, for "deep sub-micron" (DSM) manufacturing processes (i.e. those less than or equal to 0.18 micron), the problem of wire delay becomes a significant issue. Prior to DSM, most of the delay on a chip was due to the logic gates, and the delay associated with the wires was relatively insignificant. However, for 0.18 micron processes, the delay of the wires is at least equal to the delay in the gates, and at 0.13 micron technology, the wire delay becomes dominant. This is a significant paradigm shift and requires a new design methodology in order to properly address the new issues raised. Further complicating 0.13 micron design, is that there are now 6 metal layers (horizontal and vertical pairs which produce three different wire levels) in which to route the wires. Each layer has a different thickness, resulting in wires of different maximum speeds (fast, medium and slow). Thus, a designer must now also decide which wire layer is appropriate for each wire.

The problem of wire delay dominance can cause serious problems for standard prior art design techniques. Using traditional techniques, integrated circuits (hereinafter "chips") are generally designed using logic blocks (modules) comprising 10,000–50,000 gates. Modern designs having 10 million or more transistors are simply too large for current design tools to handle, so the designs are broken down in manageable blocks. A design is created using an RTL (register transfer level) design tool such as Verilog or VHDL. This describes the design in terms of functionality at cycle boundaries. The design is then synthesized and the logic optimized for each logic block (local optimization). Finally, the design is physically synthesized, which is the first time that the whole chip is considered. The physical synthesis process comprises actually placing the blocks and routing the wires.

Each stage (RTL, logic synthesis, physical synthesis) generally takes several weeks. After the process is complete, certain wires will be too long (i.e. too much delay), so the whole process must be repeated. However, as a result of the re-design some other wires now have too much delay. This problem is known in the industry as the "timing convergence" problem. According to some empirical studies, it generally takes 50 iterations in order to complete a design. At several weeks per iteration, the design cycle time is a significant factor in the cost and delay in the design and implementation of a chip. When the wire delays actually become dominant for DSM designs, the timing convergence problem is seriously exacerbated.

In order to overcome some of the aforementioned problems, it would be desirable to optimize each global wire to run as fast as possible by inserting repeaters at optimal distances. While some solutions exist for buffer insertion, a solution that does not require absolute timing constraints has not been shown.

SUMMARY OF THE INVENTION

The present inventors have realized the need for solving timing-closure problems by controlling the behavior of the long wires and thereby optimize delays on wires in circuit designs. The present invention provides a method for inserting buffers to optimize delays on wires in circuit designs.

In one embodiment, the present invention is embodied as a method of inserting buffers in a circuit design, comprising the steps of, preparing a physical hierarchy of the circuit design with placed macros, performing global routing on the physical hierarchy, determining a number of buffers to be inserted on each edge of nets of the global routing for boosting timing performance of the nets, calculating a position for each buffer, and inserting a buffer configured to boost timing performance at each calculated position.

The invention includes a method of correcting polarity with a minimized number of inverters in at least one path within a network, comprising the steps of, marking all branch nodes with a polarity of a signal emanating from a driver up to the branch node being marked, marking all sinks with a polarity of a signal emanating from a driver up to the branch node being marked, traversing the network from each sink to an immediate branch node, calculating a cost of correcting polarity of each sink, carrying backwards the calculated cost to each sink, and repeating said steps of traversing, calculating, and carrying until a root of the network is reached, and forward visiting the network and inserting inverters to fix the polarity.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE PREFERRED EMBODIMENTS

Figure 1:
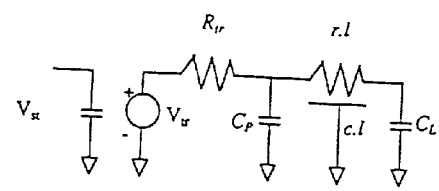
FIG. 1 is a schematic of a first order model for a generic restoring buffer driving a capacitive load through a homogeneous line of length l.

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method of inserting repeaters in integrated circuit wires, without timing constraints. Any and all such modifications, equivalents and alternatives are intended to fall within the spirit and scope of the present invention.

In general, the present invention relates to speeding up electrical signals in integrated circuit chips to either improve performance of the chips and/or to alleviate timing violation problems. The design of today's chips involves many iterations in order to get closure on the timing constraint problem. This is due to the lack of tight coupling between the logic synthesis and the physical layout. Since most of the timing problems are caused by the physical aspect of the design, the present invention formulates a solution to speed up signals using physical information before logic synthesis has been done.

As described in related to U.S. Provisional Patent Application Ser. No. 60/245,334, entitled "SYSTEM CHIP SYNTHESIS," herein incorporated by reference, a key principle to overcome the wire-delay dominance problem is the application of physical optimizations such as block placement, layer assignment (also called wire-planning), routing and buffering of global interconnects before the synthesis of the individual blocks of the design. According to this approach, buffers are inserted into the global nets after the steps of wire-planning and routing. Thus, the topology is a given.

The primary goal of the buffer insertion step is to improve the delay of long interconnects between blocks of the design. The key difference from all previous prior art approaches to buffer insertion is that absolute timing constraints are unavailable at this step in the design methodology. Qualitative timing constraints that declare a net to be "fast", "slow", "medium" or "don't know" (there may be other categories) are optionally available and are presumably used to drive the wire-planning optimization. The derivation of these qualitative timing constraints will be discussed below. Thus, the buffer insertion process will be positioned to derive the best possible delay for the net, given the existing topology and layer assignment of the interconnect.

Traditional solutions approached the problem by first performing logic synthesis, followed by the physical chip layout. After performing timing analysis, a list of critical paths is extracted and the buffering is done on those critical paths. This approach is less than desirable for many reasons:

1. The designer has to wait until the layout of the design in order to know that there is a timing problem.

2. Optimizing some paths may cause new problems with other paths that share logic with the improved paths.

3. Traditional approaches are carried out after initial logic synthesis, physical design and subsequent logic synthesis.

4. Some paths can not be improved and a redesign of the chip at the logic level is required (redo logic synthesis).

As stated above, the present invention concerns the step of buffer insertion into global nets. In this step, buffers are inserted into global nets after the steps of wire-planning and routing. As described herein, the present invention only provides the position for the buffers to be inserted in each global net. The routing program together with the block-placer and the cell-level placer must ensure that the inserted buffers are introduced into legal locations. Attachment of the buffers to the power grid is also a responsibility of these tools. Therefore, it is imperative that the routing and placement tools be incremental in nature.

Figure 6:
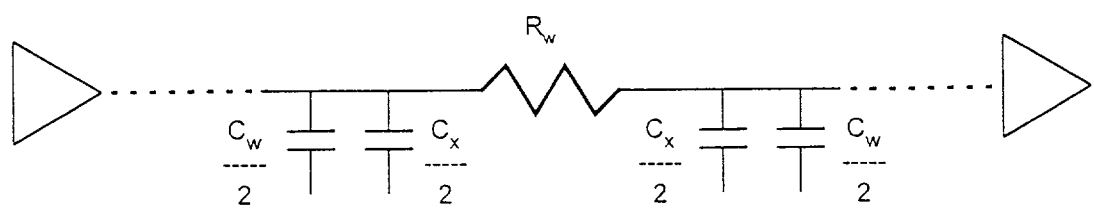
FIG. 6 is a circuit diagram of an RC model.

For the purposes of the derivations discussed herein, the layer to layer coupling capacitance is ignored. However, in an actual implementation, this information will be available and should be accommodated in the buffer insertion process. If the cross-coupling between two or more nets is lumped into a single value $C_X$, then $C_X$ will be distributed with the wire capacitance in the electrical model. Different electrical models can be used with varying accuracy. If we use a Π-model, then the RC model of a segment of a net is as shown in FIG. 6:

where $R_w$ is the wiring resistance of the segment;

$C_w$ is the wiring capacitance of the segment; and $C_X$ is the cross-capacitance of the net and its adjacent nets (aggressers).

Buffer Insertion

The discussion of this section relies upon the following assumptions:

1. The physical hierarchy of the chip is given.
2. Physical blocks have been placed.
3. Pin assignment has been performed (although an estimate assignment is sufficient).
4. Global nets connecting two or more blocks of the chip have been identified.
5. Each global net has been assigned to a candidate metal layer (or set of layers). (This process is termed wire-planning.)
6. Routing of the global nets has been performed.

The goal of buffer insertion is to add buffers on existing nets to decrease the delay. Since the target delay for a net is unavailable, the goal is to derive the optimal delay within the bounds of the assumptions stated above. This optimality is discussed in the next section, before the detailed derivations of the optimal buffer insertion process are described.

Principle of Optimal Buffer Insertion

As stated above, since global chip-level optimizations are performed before performing the local block-level optimizations, timing information is not yet available for the blocks. Buffer insertion must thus be performed without the availability of detailed timing information. Note that layer assignment and routing are also performed without detailed timing constraints. According to the present invention, the wires are initially made to operate as fast as possible. This form of initial over-design on wire delays serves multiple purposes:

1. As shown in subsequent sections, optimal buffering yields a very powerful model for delay estimation. Wire delay under optimal buffering is linear in length. This model will be used to control the layer assignment and routing process. Note that both these tasks would be nearly practically intractable without a simple delay model. Also, length driven metrics are fairly imprecise in the absence of optimal buffering.
2. No estimation is needed as to what the timing for a wire should be. Once a wire is determined to require a low delay, it gets the least possible delay by ensuring a good layer assignment, route and optimal buffer insertion. If a wire is determined to be able to withstand a longer delay, it's route and assigned layers yield more delay. Within these routes and layers, optimal buffering is still employed.

Classification of nets depends on many factors like criticality of logic that relies on the net. The noise tolerance of the net, the adjacent wiring that is impacted by this net.
3. The problem with chip-level timing closure problem is overcome. Chip-level timing closure occurs with the wire delays between blocks, and the Shell logic on each end of the wire.
4. The over-design underlying the optimal buffering strategy may be easily recovered using a timing driven algorithm, as described in R. Murgai.
5. The optimal buffering procedure is based on closed form results. Thus, the position and size of buffers on a net that yield the optimal delay are available from simple calculations—yielding a constant time algorithm. Note that the optimal buffer insertion procedure does not exclude the use of a timing driven buffer insertion procedure such as that proposed by van Ginneken [L. P. P. P. van Ginneken, *Buffer Placement in Distributed RC-tree Networks for Minimal Elmore Delay*. Proceedings of the International Symposium on Circuits and Systems, 1990, pp. 865–868]. However, as explained below, the van Ginneken algorithm is unsuitable for multi-terminal nets in the absence of timing constraints.

Point to Point Optimum Buffer Insertion

Otten and Brayton, R. H. J. M. Otten and R. K. Brayton, *Planning for Performance*, Proceedings of the Design Automation Conference, San Francisco, June 1998, originally provided a closed form optimal buffer insertion solution for a wire connecting two points. The first order model for a generic restoring buffer driving a capacitive load through a homogeneous line of length l is given in FIG. 1, where $V_{tr}$=voltage controlled voltage source;
$V_{st}$=voltage at input cap of the reporter;
$R_t$=equivalent transistor resistor;
$C_P$=drain capacitance of transistors;
r,c=resistance/unit length and capacitance per unit length of wire;
l=length of the wire; and
$C_L$=load capacitance.

The delay between the switching of the buffer and the completion of the swing is derived as:

$$t = R_{tr}(C_L + C_p) + (cR_{tr} + rC_L)l + rcl^2/2$$

The line is assumed to be divided into n equal segments by inserting identical buffers of size s (in multiples of minimum size inverter). Thus, $R_{tr} = r_0/s$, $C_L = S\, c_0$, and $C_p = S\, c_p$. The initial driver of the line is assumed to have the same size, possibly after cascading up from smaller initial drivers for optimum speed. The total delay for n such sections of length l/n is:

$$T = nt = n[r_0(c_0 + c_p) + cr_0/s + rc_0 s]l/n + rcl^2/2n^2$$

The minimum delay that yields the optimum length of each section yields $n_{opt}$ (number of optimal sections) and $S_{opt}$. Hence, the delay of a line that is optimally buffered is linear in its length.

$$l_{crit} = l/n_{opt} = P/\sqrt{rc}$$

Using derivations such as those described in Otten et al., the optimum repeater size is:

$$S_{opt} = \sqrt{\frac{r_0 c}{c_0 r}}$$

Figure 2:
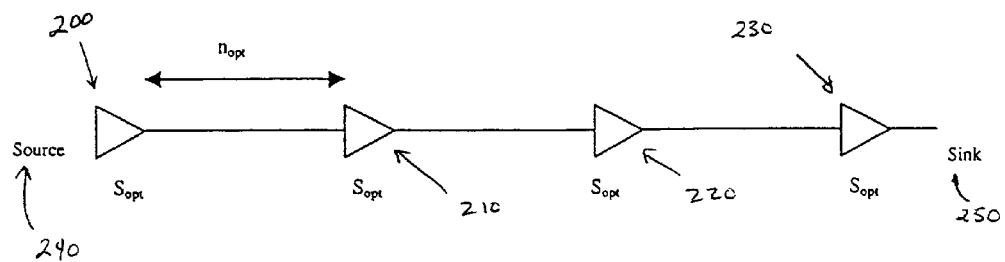
FIG. 2 illustrates optimum buffer insertion in a point to point net.

FIG. 2 provides an illustration of optimal buffer insertion in a point to point net. Buffers 200, 210, 220, and 230 of size $S_{opt}$ are placed at distances of $n_{opt}$ between a source 240 and a sink 250.

The following assumptions and their implications should be noted in the Otten-Brayton derivations:
1. The buffer size of $S_{opt}$ exists in the library. If not, use the smallest buffer larger than $S_{opt}$.
2. Repeaters (also referred to as buffers) can be placed at the distance $l_{crit}$ ($l_{crit}$ is the critical length of the optimal section). The sensitivity of the delay to the position of the buffer can be plotted. There is very little variation in delay if the buffer is not placed at $l_{crit}$.
3. The net is routed on a single layer-pair (two adjacent layers with one layer routed in the horizontal direction, the other in the vertical direction). Each layer in the layer-pair has similar wire-widths implying identical resistance and capacitance per unit length. This assumption will be relaxed in a later section.
4. Wire capacitance for each layer is assumed to be constant per unit length. Wire-sizing is ignored in the formulation. Coupling capacitance is ignored in the formulation. It can be accounted for in the delay-model when calculating the delay bounds.

Optimal Buffer Insertion for Multi-Terminal Nets

In this section, the Otten-Brayton formulation is extended to multi-terminal (single source, multiple sinks) nets. In this section the assumption that the net is routed on a single layer-pair is retained. An extension is to consider each source to sink path as a point to point net and perform optimum buffering on each of these paths individually. For N sinks, the size of the source buffer is N $S_{opt}$, which is very large, and thus this approach is impractical to apply. However, this formulation provides a lower bound on the delay achievable on each source to sink path.

The most common approach in the prior art for buffer insertion in multi-terminal nets is derived from the work of van Ginneken, that provides a polynomial-time dynamic programming algorithm for inserting buffers while minimizing the worst-case slack between the source and any sink. The primary assumption (there are others which are not relevant to the present issue) is that timing constraints (i.e. required times) are available on each of the sinks. These timing constraints are not available in the early stages of chip-level optimizations (many of the blocks are not yet implemented). Consider if the required time on each sink is set to 0 and a single buffer of size $S_{opt}$ is used to perform buffer insertion with the algorithm of van Ginneken. In the following analysis of van Ginneken's algorithm, assume that the buffers are of the same size, otherwise the algorithm is no longer polynomial, and may be infeasible to apply on real designs.

Given a required time of 0 on all the sinks of the multi-terminal nets, van Ginneken's algorithm minimizes the longest source-sink delay. If the net has only a single sink, clearly the delay achieved will be optimal. For multi-terminal nets with the same sinks all located at the same distance from the source, the delay on all paths will be approximately equal and can be expected to be near optimal. However, if the net has source to sink paths of varying lengths, then the delay achieved on all but the longest source-sink path will be sub-optimal. In particular, the delay of the short paths will be much larger than optimal, conversely the delay of the longest path will be close to optimal. If the shorter paths on the net eventually require tight timing constraints, the buffering process will have to re-invoked from scratch for this net. Due to the interactions this may yield with placement, routing and layer assignment, this could cause convergence problems in the design process.

An alternative formulation is to minimally slow down some/or all source to sink delays, while still achieving optimal delay on fanout-free long sections of the net. The rationale behind this process is two fold:

1. Since detailed timing information is not available, optimizing the delay of any single source to sink path does not make logical sense. In the later stages of design, once the delays of the logic is determined, selected paths may be slowed down by down sizing or removing buffers.
2. The process provides an upper bound on the delay of each of the source to sink paths. As mentioned earlier, the point to point optimal delay is a lower bound on each source-sink path. The available speedup is the difference in delays between the two bounds. Speedup of a source-sink path is obtained by slowing down another path.

Figure 3:
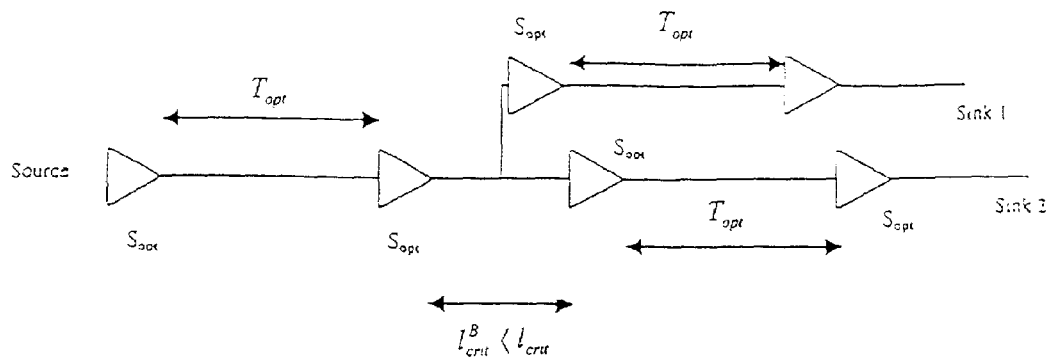
FIG. 3 illustrates optimum buffer insertion on a multi-terminal net.

In this approach, only buffers of size $S_{opt}$ (derived from the point to point case) are utilized. An example buffer insertion on a multi-terminal net is shown in FIG. 3 where:

$T_{opt}$=is the delay of an optimal stage;
$l_{crit}^B$=critical length of segment between repeater before branch point and following repeaters/receivers; and
$l_{crit}$=critical length of receiver segment.

Further, the delay between any two buffers (with or without branching) is fixed at $T_{opt}$. Since this can only be achieved at a branch point by reducing the distance between the two buffers, the overall delay from each source to sink path is increased.

Figure 4:
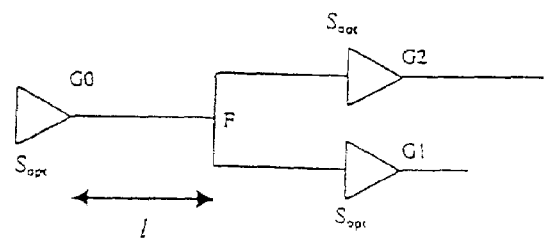
FIG. 4 illustrates buffer insertion for a multi-terminal netlist.

As shown in FIG. 4, the length of the trunk from G0 to F is denoted l, and the length from F to G1 and F to G2 is denoted k.l with 0<k<1. r0 denotes the transistor resistance of the buffer G0—this most likely is $R_{opt}$. As before, r and c denote the effective resistance and capacitance per unit length for the given metal layer. The delay from the buffer G0 to either G1 or G2 is given as:

$$D_{(G0,G1)}=D_{(Go,G2)}=[(l+2kl)c+2c_{opt}]r_0+[(l/2+2kl)c+2C_{opt}]rl+(kl\ c/2+C_{opt})r$$

Setting $D_{(G0,G1)}=T_{opt}$, given l, yields $$k=\{-(B+A+D/2)\pm[(B+A+D/2)^2-AE/2]^{1/2}\}/(A/2)$$

Where $$A=rcl^2$$

$$B=r_0cl$$

$$D=rC_{opt}l$$

$$E=r_0cl+2r_0C_{opt}+rcl^2/2+2rC_{opt}l-T_{opt}$$

Thus, $$T_{opt}>r_0cl+2r_0C_{opt}+rcl^2/2+2rC_{opt}l$$

$$T_{opt}>(cl+2C_{opt})r_0+(cl/2+2C_{opt})rl$$

The term (c l+2 $C_{opt}$) $r_0$+(cl/2+2$C_{opt}$) rl denoted $T_{lumped}$ is the R-C delay of the trunk of length l from G0 up to F with the gate capacitance lumped at the branch point. If $T_{lumped} \geq T_{opt}$, a buffer is placed at the branch point. If $T_{lumped} < T_{opt}$, there exists k>0, such that a buffer can be placed on each branch at distance k. l from F, such that the delay between G0 and each buffer is $T_{opt}$. Note that k is obtained as the solution of a quadratic equation. In the case that the buffer is placed at F, the delay between G0 and the buffer at F may be less than $T_{opt}$, since the distance on this fanout-free segment is <$l_{crit}$ which denotes the stage distance for optimal point to point buffer insertion.

The result can be generalized to the case with fanout of n. Only the final result is shown:

$$T_{opt}>(cl+nC_{opt})r_0+(cl/2+nC_{opt})rl$$

$$T_{lumped}=(cl+nC_{opt})r_0+(cl/2+nC_{opt})rl$$

A buffer is inserted at the branch point if $T_{lumped}>=T_{opt}$ and is placed on each branch at distance k. l if $T_{lumped}<T_{opt}$.

Optimal Buffer Insertion for Multi-terminal and Multi-layer Nets

Figure 5:
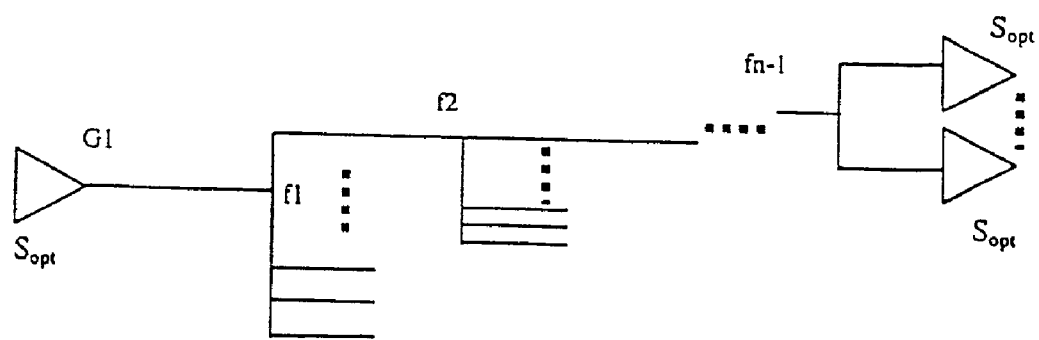
FIG. 5 illustrates buffer insertion for a multi-terminal, multi-layer net.

The analysis above assumed that the multi-terminal net routed on a single layer. Of course in an actual design a net may be routed on several layers of metals. As before, we will attempt to keep the stage delay at $T_{opt}$. FIG. 5 illustrates buffer insertion for a multi-terminal, multi-layer net, and provides a schematic representation of this problem. A branch point on a net is a junction that has more than one segment stemming out of it. Each such branch point is denoted Bi (each located at f1, f2, fn-1), i≧0, where B0 represents the source of the net (output of G1). At every branch point, assume uniform distribution of the load capacitance across the branches—this is realized by ensuring the buffer of size $S_{opt}$ is placed at the appropriate location on each of the branches. Let the fanout count at the Bi be denoted fi, with fi>0. Citrunk and Ritrunk denote the capacitance and resistance of the segment between the previous branch point and the branch point Bi. Cibranch denotes the load capacitance of each segment at the branch point Bi.

The algorithm proceeds from the driver of the net to process all the connected edges in a branch first search (BFS) manner. For each connected edge in the next stage, the algorithm visits the downstream nodes emanating from the edge in a Depth First Search (DFS) manner. For each edge, compute the optimal number of buffers to be added on that edge (Eq. 1). If a solution exists, then buffers are inserted and the last buffer on that edge is queued for further processing. If no solution exists, then no buffer can be introduced on this edge. However, to guarantee that the delay for the current stage is not bigger than $T_{opt}$, buffers would have to be inserted on the driven branches to isolate the wiring load of the succeeding stages. The load of the driven branches is determined by assuming a uniform distribution of the load for all connected branches (Eq. 2) while accounting for the delay of the wires connecting the branch point to the introduced buffers. The locations of the buffers are computed by Equation 3 (Eq. 3). All inserted buffers are queued for further processing after all nodes of the current stage have been visited.

$$D^{i-1} + R_{eq}(C^i + f_i C_x^i) + R^i(C^i/2 + f_i C_x^i) = T_{opt} \quad (\text{Eq. 1})$$

$$\Rightarrow (R_{eq}^{i-1} + R^i) f_i C_x^i = T_{opt} - D - (R_{eq}^i + 1/2 R^i) C^i$$

$$\Rightarrow (C_x^i = T_{opt} - D^{i-1} - (R_{eq} + 1/2 R^i) C^i / (R_{eq}^i + R^i) f_i$$

$$D^i = R^i [C^i/2 + (f_i - 1) C_x^i] + R_{eq}^i [C^i + (f_i - 1) C_x^i] \quad (\text{Eq. 2})$$

$$R_{eq}^i = \sum_{j=0}^{i-1} R^j \quad (\text{Eq. 3})$$

1. The branch capacitance is still distributed uniformly at the branch point. This value is only used to check whether the stage can drive such a load. When processing the next stage, the actual capacitance of the wire added to the next branch capacitance is used. This enables the recovery of some of the capacitance and gives it to the other segments at a branch point. This happens when a buffer has to be dropped even though the branch load capacitance is less than the computed value. This implies that due to the pure loading effect, a stage has to be buffered. The difference between the calculated branch capacitance and the actual one can be recovered and passed on to the other branches. This may yield some saving in the buffers introduced.

2. When moving forward and processing a segment, the sum of the resistance of all the segments that are on the path from the driver to the segment in question has to be passed on. Also, the delay introduced by those resistances has to be passed on. This delay is dependent on the assumed capacitance of the off-path branches and the actual ones of the segments of the path from the driver and the segment in question.

The term $C^i_{branch}$ is calculated given the existing topology. We have:

$$C_{branch}^{i-1} = f_n C_{branch}^i + C_{trunk}^i$$

Given $C^n_{branch} = C_{opt}$, we can compute $C^{n-1}_{branch}$, $C^{n-2}_{branch}$, ..., $C^2_{branch}$, $C^1_{branch}$ inductively.

The delay of the path from the source B0 through the branch Bi including one of its fanout segments is given as:

$$T_i = (C_{trunk}^i + f_i C_{branch}^i) r0 + \sum_{i=1}^{n} (C_{trunk}^i / 2 + f_i C_{branch}^i) R_{trunk}^i$$

The algorithm for determining whether a buffer is required on each segment can now be determined as follows:

No buffer is inserted between B0 and Bi if $T_{opt} > T_i$

A buffer is inserted on the trunk before $B_i$ if $T_{opt} < T(i)$ and $T_{opt} > T_j$ where $B_j$ is the branch point preceding $B_i$.

$$D^{i-1} + R_{eq}(C^i + f_i C_x^i) + R^i \left( \frac{C^i}{2} + f_i C_x^i \right) = T_{opt}$$

$$C_x^i = T_{opt} - D^{i-1} - \frac{\left( R_{eq}^i + \frac{1}{2} R^i \right) C^i}{(R_{eq}^i + R^i) f^i}$$

$$D^i = R^i \left[ \frac{C^i}{2} + (f_i - 1) C_x^i \right] + R_{eq}^i [C^i + (f_i - 1) C_x^i]$$

$$R_{eq}^i = \sum_{j=0}^{i-1} R^j$$

$$D^{i-1} + R_{eq}^{i-1}(C^i + C_{opt}) + R^i(C^i/2 + C_{opt}) = T_{opt}$$

$$D^{i-1} + R_{eq}^{i-1}(xl_i c + C_{opt}) + xl_i r(xl_i c/2 + C_{opt}) = T_{opt}$$

$$\Rightarrow 1/2 rc l_i^2 + (c R_{eq}^{i-1} + r C_{opt}) l_i x + D^{i-1} + R_{eq}^{i-1} C_{opt} - T_{opt} = 0$$

Cxi is a capacitance contribution of a branch segment seen by a driving node. Fi is fan out.

Accounting for Staircasing in Global Routes

The algorithm above does not take into account staircasing that is introduced by the global router to avoid obstructions. Since the length of the wires on a staircase can be very small, the algorithm above will try to insert more buffers than needed. This happens because the branch capacitance at the end of the small staircase edges can not drive the big load introduced by wires and logic. To remedy this situation, all segments that are in series get merged to form a merged segment of a specific layer. The length of each staircase segment gets scaled by the ratio of its per-unit-length resistance and that of the merged layer. The merged layer can be any routing layer in the technology file. If we pick metal to be the layer of choice, then the algorithm will merge all segments that are in series starting at the current branch point until either another branch pint or sink is reached.

To decide whether a segment can be sped up by buffering, the ratio of the pure wire delay of the merged segment Req*Ceq (where Req and Ceq are the equivalent resistance and capacitance of all the merged segments) to that of the isolated buffer delay, is checked.

$$T = n \left[ 0.7 r_o \left( C_o + C_p + \frac{cl}{n} \right) + 0.4 \frac{rl}{n} \left( \frac{cl}{2n} \right) + 0.7 \frac{rl}{n} C_o \right]$$

$$\Rightarrow T = 0.7 r_o \left( C_o + C_p + \frac{cl}{n} \right) n + cl + 0.4 rc \frac{l^2}{2n} + 0.7 rl C_o$$

$$\Rightarrow \frac{\partial T}{\partial n} = 0.7 r_o (C_o + C_p) - 0.2 rc \frac{l^2}{n^2}$$

-continued $$\frac{2T}{2n} = 0 \Rightarrow n^2 = \frac{0.2rcl^2}{0.7r_o(C_o + C_p)}$$

For n≧2 (for at least one buffer stage)

$$\Rightarrow 0.2rcl^2 \geq 4(0.7r_o(C_o + C_p))$$

$$\Rightarrow \frac{rcl^2}{2} \geq 7r_o(C_o + C_p)$$

Wire delay should be at least 7 times that of a driver for a buffer to be needed and improve delay.

If the merged edge can be sped up, the number of optimal buffers is computed. For each buffer, the location where that buffer is to be inserted on the merged edge is computed and then mapped to the actual global route by walking the global routes edges until the actual edge where the insertion should take place is reached.

The buffers are inserted at a distance $l_{crit}$ from the start of the merged segment. Since $l_{crit}$ reflects the scaled layer's length, it is scaled back to the length of the edge being currently processed. A buffer is introduced on that edge and the process continues until all buffers are inserted. The last buffer introduced is queued for further processing to handle the introduction of buffers on the branches and decide on the uniform distribution of the load across all edges.

Preserving Signal Polarity

This problem can be handled very easily without regard to the cost of the new inverters introduced, or it can be handled with an algorithm that minimizes the number of needed inverters to fix the polarity of the signal at the leaf-nodes. To handle this problem, the polarity of the original signal can be easily fixed by labeling the leaf-nodes with the resulting polarity after the insertion of inverters. If the polarity of the original signal has been changed, introducing another inverter will solve this problem. Multi-receiver global nets are characterized by a big number of fanout. In addition, due to the increasing complexity and size of today's and future designs, the number of signals that can be labeled as global signals (inter-block signals) is also increasing. In the System-on-Chip (SOC) paradigm, the number of soft and hard macros is increasing as well as the number of signals that run between them. Thus it would be desirable to handle this problem and minimize the overhead of the needed inverters. The following algorithm is used to correct the polarity and minimize the inverters introduced:

1. Mark all branch-nodes (nodes with more than two segments) and sinks with the polarity of the signal from the driver up-to that branch-node.
2. Traverse network from sinks to the immediate branch-nodes. Carry backwards the cost of fixing the polarity of each sink. Cost of sink is either 0 or 1 depending on whether polarity is even or odd.
3. At a branch-node, the cost of fixing the polarity is the minimum of fixing the polarity on the segment driving the branch-node or fixing it on the branches stemming out of the branch-node. If the downstream nodes have the correct polarity, then zero is stored at the branch-node and carried backwards to the up-stream branch-node. In addition to the cost, a directive is stored to indicate whether the minimum cost is associated with inserting an inverter on the trunk feeding the branch point or whether the inverters should be inserted on the down-stream segments.
4. Once the root of the network is reached, the network is visited forward and the insertion process continues to fix the polarity.

Special Handling of Near-end Receivers

As stated earlier, the present invention solves the timing-closure problem by controlling the behavior of the long wires that are usually seen in the top level of the chip. Ideally, the slow receivers would be sped up without penalizing the fast ones. Obviously, this is not always possible. Some heuristics can be employed to screen those fast receivers and try not to slow them down. Also given that the algorithm proceeds in a DFS manner from driver to all sinks, it is not always known which sinks should be handled and which should be left alone either to be sped up by cascading drivers or left as is. Special handling is also needed for the branches where the major component of the delay between a source-sink pair is due to the load capacitance. In this case, the delay will not be improved by inserting buffers on the wires connecting them. One heuristic has been introduced that applies to the case where the major component of the delay between a source-sink pair is due to the loading. In this case, the delay will not be improved by inserting buffers on the wires connecting them. A heuristic is added to introduce a one-stage look-ahead to decide if a receiver is reached. If so, then a check is made to see if that receiver can be sped up or not. If the processing of the previous stage demanded that a buffer be inserted to guarantee a $T_{opt}$ delay, that decision is deferred and the buffer is introduced after the branch point, as opposed to before it. If the sink is not connected to other nodes/sinks, then no buffers are inserted even though the stage delay might be bigger than $T_{opt}$. This will help eliminate cases where the near-end receivers are slowed down by the fact that the algorithm tries to guarantee that each stage's delay is not bigger than $T_{opt}$.

Experimental Results

The following table details the results of repeater insertion. The results were produced by using a 2× size repeater (twice the size of a minimum size driver). The same algorithm can be used to insert optimal size repeaters ($S_{opt}$).

| DESIGN | TEST1 | TEST2 | TEST3 | TEST4 |
| --- | --- | --- | --- | --- |
| Nets | 1960 | 503 | 4863 | 6573 |
| Reptr | 2990 | 22 | 1456 | 788 |
| $T_{opt}$ (ps) | 237.7 | 950 | 684 | 213 |
| Worst (ns) | 4.61 | 2.107 | 5.2 | 1.806 |
| Worst (Opt) (ns) | 2.2 | 0.88 | 4.84 | 1.47 |
| Sinks Optimized | 608 | 123 | 731 | 267 |
| Avg/Avg (Opt) (ns | 1.15/0.65 | 1.33/0.385 | 1.53/0.79 | 0.503/0.395 |

Since inserting regular size buffers is more desirable from area, routing, as well as routing point of view, 2× size repeaters were used. This is done to emphasize the point that the same algorithm can be used with regular size repeaters and still produce good results. In addition, varying the size of the repeaters a little does not impact the quality of results since the buffers have shallow optimal points in their characteristic curves. The table lists four test cases. For each test case, we have listed the number of nets, the number of repeaters used, the value of the delay of the optimal-length segment, the worst delay among those nets, the worst delay after optimization, the number of sinks optimized, and the ratio of the avg delay to that after optimization.

Signal Integrity Considerations

The discussions above have focused on achieving the optimal timing constraints. Signal integrity concerns are of increasing importance on chip designs. The best known approach to handling signal integrity constraints is based on buffer insertion. Here the techniques include periodic insertion of repeaters and polarity control of wires (i.e. whether to use an inverting or non-inverting buffer on a line). Optimal buffering naturally includes the first form of optimization since buffers are equally spaced on long wires. Although not described in detail above, an inverter or buffer may be utilized at any location where a repeater is to be inserted during optimal buffering.

As described herein, the present invention has the following advantages over the prior art approaches:
1. Speeding up signals can be carried out in the absence of timing constraints
2. Timing problems that are due to the physical design of the chip can be flagged very early in the design cycle (before logic synthesis and place and route of blocks)
3. Closer integration with logic synthesis, since the feedback is given before the Place & Route phase.
4. All signals are either sped up or minimally slowed down to avoid any biasing towards fast or slow signals, since the physical design has not been carried out
5. Multi-fanout optimization for global nets
6. Repeaters are inserted after block placement and layer-assignment. This means that the design will have a good chance of timing convergence.

Figure 7:
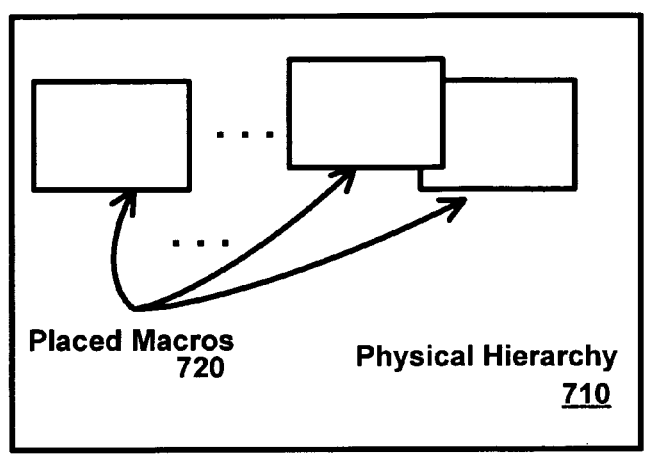
FIG. 7 is an example block diagram of a physical hierarchy of a circuit design with placed macros.
Figure 8:
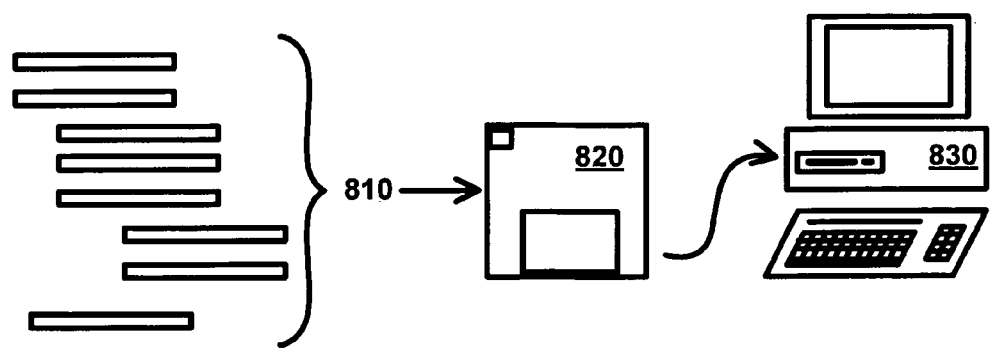
FIG. 8 is an illustration of a method of the present invention embodied in a set of computer readable instructions stored on a computer readable media.

As noted above, in one embodiment, the present invention is embodied as a method of inserting buffers in a circuit design, including the step of preparing a physical hierarchy of the circuit design with placed macros. FIG. 7 is an example block diagram of a physical hierarchy 710 of a circuit design with placed macros 720. As illustrated in FIG. 8, the method itself may be, for example, embodied in a set of computer instructions 810 stored on a computer readable media 820. The computer instructions, when loaded into a computer 830, cause the computer 830 to perform the steps of the method.

What is claimed and desired to be secured by Letters Patent of the United States is:

1. A method of inserting buffers in a circuit design, comprising the steps of:
   preparing a physical hierarchy of the circuit design with placed macros;
   performing global routing on the physical hierarchy;
   determining a number of buffers to be inserted on each edge of nets of the global routing for boosting timing performance of the nets;
   calculating a position for each buffer; and
   inserting a buffer configured to boost timing performance at each calculated position;
   wherein:
   said step of determining a number of buffers comprises the steps of:
   identifying a set of at least one edge in said nets for inserting buffers; and
   determining an optimal number of buffers to be inserted on each edge said step of determining an optimal number of buffers comprises the step of, calculating, for each edge, the optimal number of buffers based on an optimal timing for the edge, a delay of the edge, and an impedance of the edge; and
   said step of calculating the optimal number of buffers comprises calculating $$C_x^i = T_{opt} - D^{i-1} - \frac{\left(R_{eq}^i + \frac{1}{2}R^i\right)C^i}{(R_{eq}^i + R^i)f^i};$$

where $C_x^i$ is a capacitance contribution of a branch of a merged segment on an edge as seen by a driving node of the segment;
$T_{opt}$ is the delay of an optimal stage;
$D^i$ is delay of the edge;
$R_{eq}^i$ is an equivalent resistance of the merged segment;
$f^i$ is fanout of the branch;
$R^i$ is a resistance of the edge; and
$C^i$ is a capacitance of the edge.

2. The method according to claim 1, wherein said buffers are inverters.

3. The method according to claim 1, wherein said buffers are repeaters.

4. The method according to claim 1, wherein:
   said step of calculating the optimal number of buffers includes the steps of,
   determining a uniform load distribution for all branches connected to the edge, and
   adjusting for a delay introduced by the inserted buffers.

5. The method according to claim 1, further comprising the steps of:
   uniformly distributing a capacitance of each branch of the nets at a corresponding branch point;
   determining a load at each branch point; and
   checking if a buffer inserted at each branch point is capable of handling the load determined for that branch point.

6. A method of inserting buffers in a circuit design, comprising the steps of:
   preparing a physical hierarchy of the circuit design with placed macros;
   performing global routing on the physical hierarchy;
   determining a number of buffers to be inserted on each edge of nets of the global routing for boosting timing performance of the nets;
   calculating a position for each buffer; and
   inserting a buffer configured to boost timing performance at each calculated position;
   wherein:
   said step of determining a number of buffers comprises the steps of:
   identifying a set of at least one edge in said nets for inserting buffers; and
   determining an optimal number of buffers to be inserted on each edge;
   said step of determining an optimal number of buffers comprises the step of,
   calculating, for each edge, the optimal number of buffers based on an optimal timing for the edge, a delay of the edge, and an impedance of the edge; and
   said step of calculating the optimal number of buffers includes the steps of:
   determining a uniform load distribution for all branches connected to the edge; and
   adjusting for a delay introduced by the inserted buffers; and said step of determining a uniform load distribution comprises calculating a stage delay for each branch, comprising:

$$D^i = R^i \left[ \frac{C^i}{2} + (f_i - 1)C_x^i \right] + R_{eq}^i [C^i + (f_i - 1)C_x^i];$$

where:
$D^i$ is a stage delay for branch i;
$R^i$ is resistance of branch i;
$R_{eq}^i$ is an equivalent resistance of merged segments of branch i;
$C^i$ is capacitance of branch i; and
$f^i$ is a fanout of branch i.

7. A method of inserting buffers in a circuit design, comprising the steps of:
preparing a physical hierarchy of the circuit design with placed macros;
performing global routing on the physical hierarchy;
determining a number of buffers to be inserted on each edge of nets of the global routing for boosting timing performance of the nets;
calculating a position for each buffer;
inserting a buffer configured to boost timing performance at each calculated position;
uniformly distributing a capacitance of each branch of the nets at a corresponding branch point;
determining a load at each branch point; and
checking if a buffer inserted at each branch point is capable of handling the load determined for that branch point;
wherein said steps of determining a number of buffers and calculating a position for each buffer comprise:
identifying a driver of a net to have buffers inserted;
performing a breadth first search (BFS) of the net starting at the identified net driver and processing all connected edges;
performing a depth first search (DFS) starting at a next stage in the net; and
for each edge, determining a number of buffers to be inserted on each edge of nets of the global routing for boosting timing performance of the nets, and calculating a position for each buffer.

8. The method according to claim 7, further comprising the steps of:
determining an actual capacitance of wires added to a branch at a branch point in a net;
using the actual capacitance in determining the number and position of buffers; and
redistributing capacitance comprising a difference between a calculated branch capacitance and the actual capacitance to other segments at said branch point.

9. The method according to claim 7, further comprising the steps of:
summing of resistances in all segments between a driver to a current segment being processed;
determining a sum of delays caused by the summed resistances; and
passing the summed resistances and delays on to a next segment to be processed.

10. The method according to claim 7, wherein:
said method is embodied in a set of computer instructions stored on a computer readable media;
said computer instructions, when loaded into a computer, cause the computer to perform the steps of said method.

11. The method according to claim 10, wherein said computer instructions are compiled computer instructions stored as an executable program on said computer readable media.

12. The method according to claim 7, further comprising the steps of:
identifying a set of staircase edges in the circuit design;
forming a merged segment of all segments in the staircase at a preselected layer;
scaling a length of each staircase segment by a ratio taking into account parameters of the staircase and the merged segment;
determining if any of the segments will be sped up using an inserted buffer; and
inserting buffers on the merged segment if the merged segment is sped up by the insertion.

13. The method according to claim 12, wherein said ratio comprises a ratio of a segment per unit length resistance and a per unit length resistance of the merged layer.

14. The method according to claim 12, wherein said step of determining if any of the segments will be sped up comprises, determining if the ratio of a pure wire delay of the merged segment to that of an isolated buffer delay is greater than or less than 1.

15. The method according to claim 12, wherein said step of inserting buffers comprises inserting buffers at a distance of $l^{crit}$ from one of a start of the merged segment and a preceding buffer.

16. A method of inserting buffers in a circuit design, comprising the steps of:
preparing a physical hierarchy of the circuit design with placed macros;
performing global routing on the physical hierarchy;
determining a number of buffers to be inserted on each edge of nets of the global routing for boosting timing performance of the nets by calculating, for each edge, the optimal number of buffers based on an optimal timing for the edge, a delay of the edge, and an impedance of the edge;
identifying a set of at least one edge in said nets for inserting buffers;
determining an optimal number of buffers to be inserted on each identified edge; and
inserting the optimal number of buffers configured to boost timing performance at each of calculated positions;
wherein:
each edge comprises a plurality of branches; and
said step of calculating the optimal number of buffers comprises calculating a capacitance $C_x$ for each branch, comprising, $$C_x^i = T_{opt} - D^{i-1} - \frac{\left(R_{eq}^i + \frac{1}{2}R^i\right)C^i}{(R_{eq}^i + R^i)f^i};$$

where,
$C_x^i$ is a capacitance contribution of a branch i as seen by a driving node of branch i,
$T_{opt}$ is a delay of an optimal stage,
$D^i$ is delay of the edge,
$R_{eq}^i$ is an equivalent resistance of all merged segments corresponding to branch i,
$f^i$ is fanout of a corresponding branch i,
$R^i$ is a resistance of branch i, and
$C^i$ is a capacitance of branch i.

17. The method according to claim 16, wherein:
said method is embodied in a set of computer instructions stored on a computer readable media;
said computer instructions, when loaded into a computer, cause the computer to perform the steps of said method.

18. A method of inserting buffers in a circuit design, comprising the steps of:
preparing a physical hierarchy of the circuit design with placed macros;
performing global routing on the physical hierarchy;
determining a number of buffers to be inserted on each edge of nets of the global routing for boosting timing performance of the nets;
calculating a position for each buffer by identifying a set of at least one edge in said nets for inserting buffers and determining an optimal number of buffers to be inserted on each edge; and
inserting a buffer configured to boost timing performance at each calculated position;
wherein:
determining an optimal number of buffers comprises, calculating, for each edge, the optimal number of buffers based on an optimal timing for the edge, a delay of the edge, and an impedance of the edge;
determining an optimal number of buffers further comprises determining a uniform load distribution for all connected branches and adjusting for a delay introduced by the inserted buffers; and
said step of determining a uniform load distribution comprises calculating a stage delay for each branch, comprising, $$D^i = R^i \left[ \frac{C^i}{2} + (f_i - 1)C_x^i \right] + R_{eq}^i [C^i + (f_i - 1)C_x^i]$$

where,
$D^i$ is a stage delay for branch i,
$R^i$ is resistance of branch i,
$R_{eq}^i$ is an equivalent resistance of all merged segments of branch i,
$C^i$ is capacitance of branch i, and
$f^i$ is a fanout of branch i.

19. The method according to claim 18, wherein:
said method is embodied in a set of computer instructions stored on a computer readable media;
said computer instructions, when loaded into a computer, cause the computer to perform the steps of said method.

20. A method of inserting buffers in a circuit design, comprising the steps of:
preparing a physical hierarchy of the circuit design with placed macros;
performing global routing on the physical hierarchy;
determining a number of buffers to be inserted on each edge of nets of the global routing for boosting timing performance of the nets;
calculating a position for each buffer;
inserting a buffer configured to boost timing performance at each calculated position;
uniformly distributing a capacitance of each branch of the nets at a corresponding branch point;
determining a load at each branch point; and
checking if a buffer inserted at each branch point is capable of handling the load determined for that branch point;
wherein said steps of determining a number of buffers and calculating a position of each buffer comprises:
identifying a driver of a net to have buffers inserted;
performing a breadth first search (BFS) of the net starting at the identified net driver and processing all connected edges;
performing a depth first search (DFS) starting at a next stage in the net;
for each edge, determining a number of buffers to be inserted on each edge of nets of the global routing, wherein the buffers are for boosting timing performance of the nets; and
calculating a position for each buffer;
wherein the calculated position for each buffer position is based on a combination of stage delay, branch resistance, resistance of merged branch segments, branch capacitance, and branch fanout.

21. The method according to claim 20, wherein:
said method is embodied in a set of computer instructions stored on a computer readable media;
said computer instructions, when loaded into a computer, cause the computer to perform the steps of said method.

22. The method according to claim 20, further comprising the steps of:
determining an actual capacitance of branch added wires at a branch point in a net;
using the actual capacitance in determining the number and position of buffers; and
redistributing capacitance comprising a difference between a calculated branch capacitance and the actual capacitance to other segments at said branch point.

23. The method according to claim 20, further comprising the steps of:
summing of resistances in all segments between a driver to a current segment being processed;
determining a total delay caused by the summed resistances; and
passing the summed resistances and total delay on to a next segment to be processed.

* * * * *